US007821969B2

(12) United States Patent
DeSanti et al.

(10) Patent No.: US 7,821,969 B2
(45) Date of Patent: Oct. 26, 2010

(54) APPARATUS AND METHOD FOR PREVENTING DISRUPTION OF FIBRE CHANNEL FABRICS CAUSED BY RECONFIGURE FABRIC (RCF) MESSAGES

(75) Inventors: Claudio DeSanti, San Jose, CA (US); Marco Di Benedetto, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 12/049,932

(22) Filed: Mar. 17, 2008

(65) Prior Publication Data

US 2008/0159172 A1 Jul. 3, 2008

Related U.S. Application Data

(63) Continuation of application No. 10/155,698, filed on May 24, 2002.

(51) Int. Cl.
*H04L 12/28* (2006.01)
(52) U.S. Cl. ........................ 370/254; 709/221
(58) Field of Classification Search ................. None
See application file for complete search history.

(56) References Cited

U.S. PATENT DOCUMENTS

| 5,812,761 | A | | 9/1998 | Seki et al. | |
|---|---|---|---|---|---|
| 6,016,319 | A | * | 1/2000 | Kshirsagar et al. | 370/410 |
| 6,185,203 | B1 | | 2/2001 | Berman | |
| 6,421,711 | B1 | * | 7/2002 | Blumenau et al. | 709/213 |
| 6,493,783 | B1 | | 12/2002 | Kinoshita et al. | |
| 6,725,317 | B1 | | 4/2004 | Bouchier et al. | |

(Continued)

FOREIGN PATENT DOCUMENTS

EP 1124172 8/2001

(Continued)

OTHER PUBLICATIONS

Australian Office Action, Application No. 2003237243, mailed Oct. 4, 2007.

(Continued)

*Primary Examiner*—Phirin Sam
(74) *Attorney, Agent, or Firm*—Weaver Austin Villeneuve and Sampson LLP

(57) ABSTRACT

An apparatus and method for preventing the disruption of Fibre Channel Fabrics caused by ReConfigure Fabric (RCF) messages is disclosed. The apparatus includes a storage area network and a plurality of Fibre Channel Switches arranged in a Fabric. Each of the plurality of Switches includes logic to selectively configure their Ports to either reject or accept RCF messages. When configured to reject RCF messages, the Switch Port that receives an RCF message will generate a reject message along with a reason code explanation "E_Port Isolated", and then transition into an Isolated state. When the Switch that generated the RCF message receives the reject message, its Port also transition into the Isolated state. In accordance with the method of the present invention, either a Storage Service Provider or a client can access the Switches of the Fabric through either a command line interpreter or a management application. Once access to the Fabric is established, the logic of the Ports of the Switches can be selectively configured to reject or accept RCF messages as described above.

19 Claims, 3 Drawing Sheets

U.S. PATENT DOCUMENTS

| | | | |
|---|---|---|---|
| 6,745,281 B1 | 6/2004 | Saegusa | |
| 6,765,919 B1 | 7/2004 | Banks et al. | |
| 6,766,412 B2 | 7/2004 | Bolt | |
| 6,772,270 B1 | 8/2004 | Kurpanek | |
| 6,862,626 B1* | 3/2005 | Ryu | 709/227 |
| 6,941,357 B2 | 9/2005 | Nguyen et al. | |
| 6,980,525 B2 | 12/2005 | Banks et al. | |
| 7,039,870 B2* | 5/2006 | Takaoka et al. | 715/736 |
| 7,042,842 B2* | 5/2006 | Paul et al. | 370/229 |
| 7,093,021 B2 | 8/2006 | Blumenau et al. | |
| 7,174,390 B2 | 2/2007 | Schulter et al. | |
| 7,194,538 B1 | 3/2007 | Rabe et al. | |
| 7,209,454 B2 | 4/2007 | Beshai | |
| 7,231,430 B2 | 6/2007 | Brownell et al. | |
| 7,362,702 B2 | 4/2008 | Terrell et al. | |
| 7,606,167 B1* | 10/2009 | DeSanti et al. | 370/254 |
| 2001/0028657 A1* | 10/2001 | Brewer et al. | 370/406 |
| 2002/0065871 A1 | 5/2002 | Wakai et al. | |
| 2002/0107962 A1 | 8/2002 | Richter et al. | |
| 2002/0159385 A1 | 10/2002 | Susnow et al. | |
| 2002/0165942 A1 | 11/2002 | Ulrich et al. | |
| 2002/0172200 A1* | 11/2002 | Shin et al. | 370/389 |
| 2003/0046396 A1 | 3/2003 | Richter et al. | |
| 2003/0101245 A1* | 5/2003 | Srinivasan et al. | 709/221 |
| 2003/0130821 A1 | 7/2003 | Anslow et al. | |
| 2003/0130833 A1 | 7/2003 | Brownell et al. | |
| 2003/0210685 A1 | 11/2003 | Foster et al. | |
| 2003/0236745 A1 | 12/2003 | Hartsell et al. | |
| 2009/0327518 A1* | 12/2009 | DeSanti et al. | 709/238 |

FOREIGN PATENT DOCUMENTS

| | | |
|---|---|---|
| JP | 01-501180 | 4/1989 |
| JP | 02-132943 | 5/1990 |
| JP | 05-083270 | 4/1993 |
| JP | 06-076164 | 3/1994 |
| JP | 09-016353 | 1/1999 |
| JP | 11-032068 | 2/1999 |
| JP | 09-291021 | 5/1999 |
| JP | 11-126138 A | 5/1999 |
| JP | 11-184493 | 1/2001 |
| JP | 2001-14261 A | 1/2001 |
| JP | 2001-523861 A | 11/2001 |
| JP | 2001-523862 A | 11/2001 |
| JP | 2001-124131 | 1/2002 |
| JP | 2002-14909 A | 1/2002 |
| WO | WO/97/47126 | 12/1997 |
| WO | 99-26151 | 5/1999 |
| WO | WO/0131428 | 5/2001 |
| WO | WO 03/101144 | 12/2003 |

OTHER PUBLICATIONS

American National Standard for Information Technology, "Fibre Channel Switch Fabric -2 (FC-SW-2)" Rev. 4.0, Aug. 5, 1998. (XP-002256254).
EP Examiner Report dated Apr. 21, 2006 for EP Application No. 03 736 709.1-2416.
EP Office Action dated Sep. 14, 2007 for EP Application No. 03 736 709.1-2416.
EP Notice of Grant dated Apr. 16, 2008 for EP Application No. 03 736 709.1-2416.
C. DeSanti, Andiamo Systems Inc., "The RCF Behavior", T11/02-032v1, T11.3, Feb. 1, 2002, pp. 1-7, XP007900383.
S. Kipp, McDATA FAM MIB_comments', McDATA, Jan. 21, 2002, pp. 1-5, SP007900382.
"Fibre Channel Switch Fabric-2 (FC-SW-2)", NCITS working draft, Jun. 26, 2001.
"Fibre Channel Switch Fabric-2 (FC-GS-3)", NCITS working draft, Nov. 28, 2000.
DeSanti et al., Fibre Channel Fabric Address Manager MIB Draft-desanti-to-fabric-addr-mgr-mgr-mib-00txt, Apr. 27, 2004, 35 pages.
Non-Final Office Action for U.S. Appl. No. 10/155,698 mailed Apr. 14, 2006.
Non-Final Office Action for U.S. Appl. No. 10/155,698 mailed Sep. 14, 2006.
Notice of Allowance for U.S. Appl. No. 10/155,698 mailed Dec. 13, 2007.
PCT International Search Report mailed Nov. 10, 2003 for PCT Application No. PCT/US03/16449.
Release Notes Vixel 7000 Series Switches, 4.0 Release Firmware (Build 253), Online!, Apr. 2002, <URL:http://www.vixel.com/user_docs/Switches/7100_7200/RelNotes_00041291-001_B_(v4.0).pdf> retriedon Sep. 30, 2003.
JP OA dated Apr. 13, 2009, for Application No. 2004-507284, with translation.
CN First OA dated Jun. 26, 2009, for Application No. 03811410.0.
US Office Action dated Apr. 14, 2006 issued in U.S. Appl. No. 10/155,698.
US Office Action dated Sep. 14, 2006 issued in U.S. Appl. No. 10/155,698.
US Notice of Allowance dated Dec. 13, 2007 issued in U.S. Appl. No. 10/155,698.
U.S. Office Action dated Jun. 12, 2008, U.S. Appl. No. 10/155,698.
U.S. Office Action dated Dec. 23, 2008, U.S. Appl. No. 10/155,698.
U.S. Office Action dated Jul. 2, 2009, U.S. Appl. No. 10/155,698.
US Notice of Allowance dated Jan. 29, 2010, U.S. Appl. No. 10/155,698.
International Search Report dated Nov. 10, 2003 issued in WO2003/101144 (PCT/US/03/16449).
CA Office Action dated May 2, 2008 issued in CA Application No. 2,486,800.
CA Office Action dated Feb. 18, 2010, CA Application No. 2,486,800.
CN Second Office Action dated Jan. 15, 2010, Application No. 03811410.0.
EP Examination Report dated May 2, 2005 issued in EP Application No. 03 736 709.1-2416.
EP Examination Report dated Sep. 14, 2007, EP Application No. 03 736 709.1-2416.
EP Notice of Grant dated Apr. 16, 2008 issued in EP Application No. 03 736 709.1-2416.
EP Communication dated Apr. 21, 2006, EP Application No. 03 736 709.1-2416.
JP Office Action dated Apr. 13, 2009 for JP Application No. 2004-507284, with translation.
JP Final Office Action dated Dec. 21, 2009, JP Application No. 2004-507284, with translation.
KR Notification of Provisional Rejection dated dated Mar. 16, 2010, KR Application No. 2004-7018811.
DeSanti, C. Andiamo Systems Inc., "The RCF Behavior", T11/02-032v1, T11.3, Feb. 1, 2002, pp. 1-7, XP007900383.
DeSanti et al., Fibre Channel Fabric Address Manager MIB Draft-desanti-fc-domain-manager-00.txt; IETF Standard-Working-Draft, Internet Engineering Task Force, IETF, CH; Apr. 27, 2004, 35 pages.
Fibre Channel Switch Fabric-2 (FC-GS-3), NCITS Working Draft, Nov. 28, 2000.
Fibre Channel Switch Fabric-2 (FC-SW-2), NCITS Working Draft, Jun. 26, 2001.
Kipp, S. McDATA Fam MIB_comments, McDATA, Jan. 21, 2002, pp. 1-5, SP007900382.
Release Notes VIXEL 7000 Series Switches, 4.0 Release Firmware (Build 253), Online!, Apr. 2002, <URL:http://www.vixel.com/user_docs/Switches/ 7100_7200/RelNotes_00041291-001_B_(v4.0).pdf>retried on Sep. 30, 2003.

* cited by examiner

APPARATUS AND METHOD FOR PREVENTING DISRUPTION OF FIBRE CHANNEL FABRICS CAUSED BY RECONFIGURE FABRIC (RCF) MESSAGES

CROSS-REFERENCE TO RELATED APPLICATIONS

The present application is a continuation of and claims priority to co-pending U.S. patent application Ser. No. 10/155,698, filed May 24, 2002, which is incorporated herein by reference in its entirety.

BACKGROUND OF THE INVENTION

1. Field of the Invention

The present invention relates to storage area networks, and more particularly, to an apparatus and method for preventing the disruption of Fibre Channel Fabrics caused by ReConfigure Fabric (RCF) messages.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a number of hosts, and a plurality of Switches arranged in a Switching Fabric. The Switches selectively connect the storage devices and the hosts within the SAN.

Most SANs rely on the Fibre Channel protocol for communication within the Fabric. For a detailed explanation of the Fibre Channel protocol and Fibre Channel Switching Fabrics, see the Fibre Channel Framing and Signaling Standard, Rev 1.70, American National Standard of Accredited Standards Committee (NCITS), Feb. 8, 2002 and the Fibre Channel Switch Fabric-2, Rev. 5.4, NCITS, Jun. 26, 2001, both incorporated by reference herein for all purposes.

In Fibre Channel, each device (hosts, storage devices and Switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FC_ID), allocated dynamically to the end devices by the Fabric. Each end device acquires its FC_ID by performing a Fabric Login procedure with the Switching Fabric. In this procedure, the end device and the Fabric exchange their credentials and the operating parameters required for a successful communication across the SAN. Initially the Fabric identifies itself by an unique Fabric_Name and the end device by its unique Node_Name. Thereafter the Fabric assigns the FC_IDs to the end devices.

The three byte wide Fibre Channel addresses are hierarchically structured in three fields, each one byte long: Domain_ID, Area_ID, and Port_ID. Each Switch within the Fabric is assigned a Domain_ID. The end devices attached to a particular Switch are assigned the Domain_ID of that Switch. The Switch manages the allocation of the Area_ID and Port_ID fields for each end device to guarantee the uniqueness of the assigned addresses in that Domain. For example, if a Switch is assigned a Domain number five and the Switch subdivides its address space in two areas each having three connected end devices, then a possible Fibre Channel address allocation is: 5:1:1, 5:1:2, 5:1:3, 5:2:1, 5:2:2, and 5:2:3.

When the Switching Fabric initializes, one of the Switches is selected as the Principal Switch. The Principal Switch assigns the Domain_IDs to all the Switches in the Fabric and its Node_Name becomes the Fabric_Name of the Switching Fabric. To select the Principal Switch, all the Switches exchange with each other a message called Exchange Fabric Parameters (EFP). The EFP contains, among other parameters, the Node_Name of the sending Switch. The Switch with the lowest Node_Name is designated as the Principal Switch. All the other Switches are referred to as non-principal Switches. Once the Principal Switch is selected, it sends to its neighbor Switches a Domain Identifier Assigned (DIA) message, which informs the neighbor Switches that it has been assigned a Domain_ID by the Principal Switch. In reply, the neighbor Switches send a Request Domain-Identifier (RDI) message to the Principal Switch. The Principal Switch allocates the Domain Ids and responds by sending each Switch its Domain_ID. Thereafter, the Switches that received a Domain_ID send a DIA to their neighbor Switches, receive an RDI in reply, and forward the RDI to the Principal Switch, which assigns the Domain_IDs to the requesting Switches. This process continues until all the Switches received a Domain_ID. After having received a Domain_ID, the individual Switches assign the Area_IDs and Port_IDs for each end device in its Domain. The Fabric configuration is considered completed when all the Switches have been assigned a Domain_ID. Consequently the end devices are all assigned their Area_IDs and Port_IDs.

Fibre Channel allows the merging of two separate Switching Fabrics into one. This happens when a connection is established between two Switches each belonging to a different Fabric. When such an event occurs, the Domain_ID of some of the Switches and the FC_ID of their end devices of the merged Fabric may need to be reassigned. For example, if a Fabric A which includes Domain_IDs one, two and three (1, 2 and 3) is to be merged with a second Fabric B which includes Domain_IDs one and two (1 and 2), then the overlapping Domain_IDs (1 and 2) of one of the Fabrics must be reassigned. When two Fabrics are connected, an EFP message is exchanged across the link that connects them to determine if there is any overlap among the Domain_IDs. Depending on the outcome, one of two things may happen.

If there is any overlap of Domain_ID assignments among the Switches, the link that connects the two original Fabrics is isolated. The link is logically disconnected and is not recognized by the devices, although the physical link still remains. A SAN administrator may then request a disruptive reconfiguration of the joined Fabrics to resolve the Domain_ID conflict. In this case a ReConfigure Fabric (RCF) message is flooded across all the Switches of the two original Fabrics. This stops the delivery of all the data traffic, and each Switch revokes its Domain_ID. Thereafter, a Principal Switch is selected, new Domain_IDs are assigned to the Switches, and new FC_IDs are assigned to the end devices in the same way as described above. In this manner, the two Fabrics are merged into one.

If there is no Domain_ID overlap among the Switches, then a non-disruptive Fabric reconfiguration is automatically performed. A Build Fabric (BF) message is flooded across all the Switches of the two original Fabrics. Data frames delivery is not stopped, and each Switch keeps its Domain_ID. Since the two Fabrics each have a Principal Switch, one of the two has to "resign" from its principal status leaving only one Principal Switch for the merged Fabric. Consequently the Principal Switch selection process described above takes place. Each non-Principal Switch then makes an RDI request to the surviving Principal Switch asking for the same Domain_ID that it had before the BF message. In this way, the two Fabrics are merged without changing any Switch Domain_ID assignments or any FC_IDs assigned to the end devices.

For one of the two original Fabric, however, the Principal Switch is changed. Consequently the Fabric_Name for those Switches needs to be updated. Given that the Fabric_Name is part of the Fabric Login state information that each end device maintains, the Switches of the loosing Fabric have to re-initialize their end devices to update their new status. This process causes a disruption of the data traffic in the Fabric with the losing Principal Switch.

From the perspective of SAN availability, both RCF and BF messages are potentially problematic. A BF may lead to a partial disruption of data traffic in situations where two distinct Fabrics are merged. In general, no disruption occurs if the BF protocol is invoked inside a single Fabric. RCFs, however, will always halt the data traffic across the Fabric while the Principal Switch is identified and the Domain_IDs and FC_IDs are reassigned. As a consequence, RCF messages pose serious security concerns because a Switch in a Fabric maybe used to initiate an RCF, disrupting the functionality of the Fabric.

Traditionally this security problem is solved using "physical security", where all the Switches of a Fabric are contained inside a secure location and only the system administrator or other authorized personal are allowed to access the Fabric. In this manner, a third party such as a user or client cannot access the Switches of the Fabric and trigger an RCF. But whenever the Switches are not confined in a secure location, as in the case for example of a multi-building enterprise campus, or in the case of Storage Service Providers (SSPs), this approach is not satisfactory.

This problem is especially critical for Storage Service Providers, because they provide storage services to different clients across their infrastructure. If multiple clients are connected to the same Fabric using zoning techniques to isolate their traffic, one client could trigger an RCF. As a result, data flow operations for all clients serviced by the Fabric would be disrupted. This scenario is clearly undesirable from both the Storage Service Provider and the clients perspective.

To address this concern, SSPs typically provide a separate Fabric for each client. Thus if one client wishes to merge or otherwise update its Fabric, the Fabric of other clients will not be effected. This arrangement, however, is less than ideal. Building and maintaining separate Fabrics for each client can be expensive and difficult to manage and support.

An apparatus and method for preventing the disruption of Fibre Channel Fabrics caused by ReConfigure Fabric (RCF) messages is therefore needed.

SUMMARY OF THE INVENTION

To achieve the foregoing, and in accordance with the purpose of the present invention, an apparatus and method for preventing the disruption of Fibre Channel Fabrics caused by ReConfigure Fabric (RCF) messages is disclosed. The apparatus includes a storage area network and a plurality of Fibre Channel Switches arranged in a Fabric. Each of the plurality of Switches includes logic to selectively configure their Ports to either reject or accept RCF messages. When configured to reject RCF messages, the Switch Port that receives an RCF message will generate a reject message along with a reason code explanation "E_Port Isolated", and then transition into an Isolated state. When the Switch that generated the RCF message receives the reject message, its Port also transition into the Isolated state. In accordance with the method of the present invention, either a Storage Service Provider or a client can access the Switches of the Fabric through either a command line interpreter or a management application. Once access to the Fabric is established, the logic of the Ports of the Switches can be selectively configured to reject or accept RCF messages as described above.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
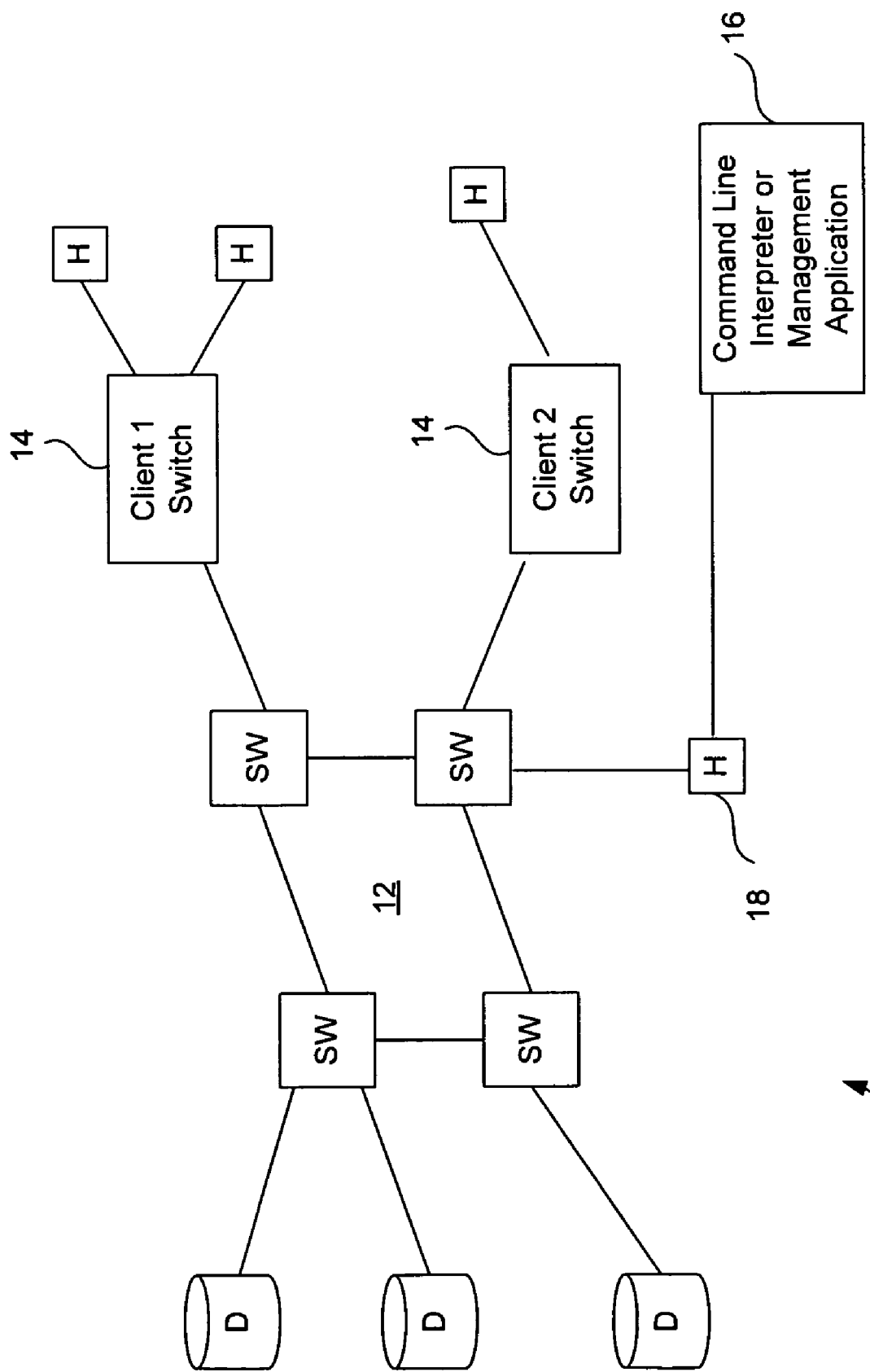
FIG. 1 is a Switching Fabric of a storage area network according to the present invention.

Referring to FIG. 1, a Switching Fabric of a typical storage area network which may be used by a Storage Service Provider is shown. The storage area network (SAN) 10 includes a Switching Fabric 12 that includes a plurality of Fibre Channel Switches SW located at the premises of the SSP and a plurality of clients Switches 14 located in the client premises. Each client includes one ore more hosts H that can access a plurality of storage devices D through the SSP's Fabric 12 and its client Switches 14. In one embodiment, a tool to manage the Fabric 12, such as a command line interpreter or a management application 16, is connected to the Fabric 12 through the host 18 inside the SSP premises. In an alternative embodiment, the command line interpreter or management application 16 may access the Fabric 12 through one of the hosts H connected to a client Switch 14. The command line interpreter or management application 16 enables a network administrator to access and apply management changes across the Fabric 12.

According to various embodiments of the invention, the hosts H can be any type of host including but not limited to servers or personal computers running on either the Unix, Windows, or any other computing platform, or a combination thereof. Similarly, the storage devices D can be any type of storage device including but not limited to tape back-up systems, emulated tape back-up systems, CD-ROM storage arrays, or one or more disks such as a Redundant Array of Independent Disks (RAID), or a combination thereof. The Switches SW can be any type of Fibre Channel Switch such as those commercially available from Brocade of San Jose, Calif. or Andiamo Systems, the assignee of the present application. It should also be noted that the Fabric 12 as shown in the figure is merely illustrative of a SAN useful for describing the present invention. In no way should its simplicity be construed as limiting the present invention which may be used in any SAN configuration. The present invention may be used in a SAN with many clients (more than the two shown) or with a SAN with multiple zones for example.

The present invention provides a way to configure the Switches SW of the Fabric 12 to selectively reject RCF messages received over their Ports. This technique can be used either when the Fabric 12 is initially configured or when a network administrator would like to implement a change across the Fabric 12 after it is in operation using either the command line interpreter or the management application 16. Further, the technique can be implemented by either a Storage Service Provider through a client controlled by the provider, through a third party client connected to the Fabric 12, typically with permission from the Storage Service Provider, or directly by the SSP itself.

Figure 2:
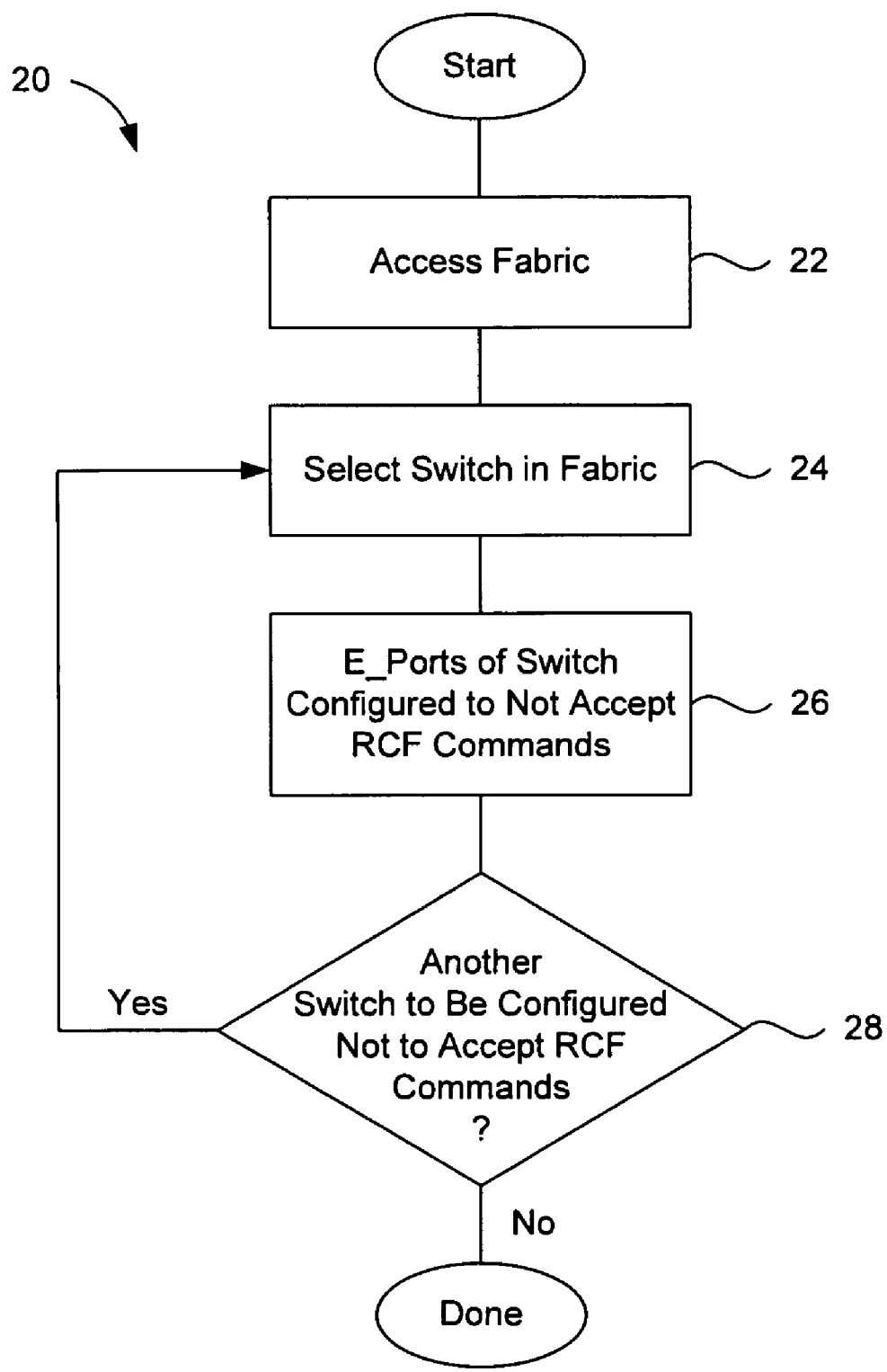
FIG. 2 is a flowchart illustrating how the Switches' Ports of the Fabric are configured to reject RCF messages according to the present invention.

Referring to FIG. 2, a flow chart 20 illustrating how the Switch Ports of Fabric 12 are configured to reject RCF messages according to the present invention is shown. According to the FC-SW-2 terminology, the term Port is used to indicate a generic Switch Port (potentially connected to a host or a storage device or to another Switch) while the term E_Port is used to indicate only a Switch Port connected to another Switch Port. Initially, the Fabric 12 is accessed by a system administrator through a command line interpreter or a management application 16 (Box 22). Thereafter, the administrator selects a Switch in the Fabric 12 (Box 24). A Switch is generally selected because it may be at risk of receiving an RCF message. The relevant Ports of the selected Switch are configured to not accept RCF messages (Box 26) using a specific configuration command. A configuration command is an administrative instruction that the system administrator issues to the selected Switch using the command line interpreter or management application 16. The configuration command is not a Switch-to-Switch message. It is therefore not defined by FC-SW-2. Rather, the configuration command is an option of the Switch that, when set, will cause the Switch E_Ports to reject RCF messages. The behavior of the Switch therefore remains in compliance with the FC-SW-2 standard. During operation, when an RCF message is received at any of the so configured E_Ports, the E_Port generates a reject message with a reason code explanation "E_Port is Isolated" and thereafter the E_Port transitions into an Isolated state. In response to the reject message, the E_Port of the Switch that generated the RCF also transitions into an Isolated state. At decision diamond 28, the administrator determines if other Ports of another Switch should be configured to not accept RCF messages. If not, the sequence is complete. If yes, another Switch is selected and the aforementioned sequence is repeated.

Figure 3:
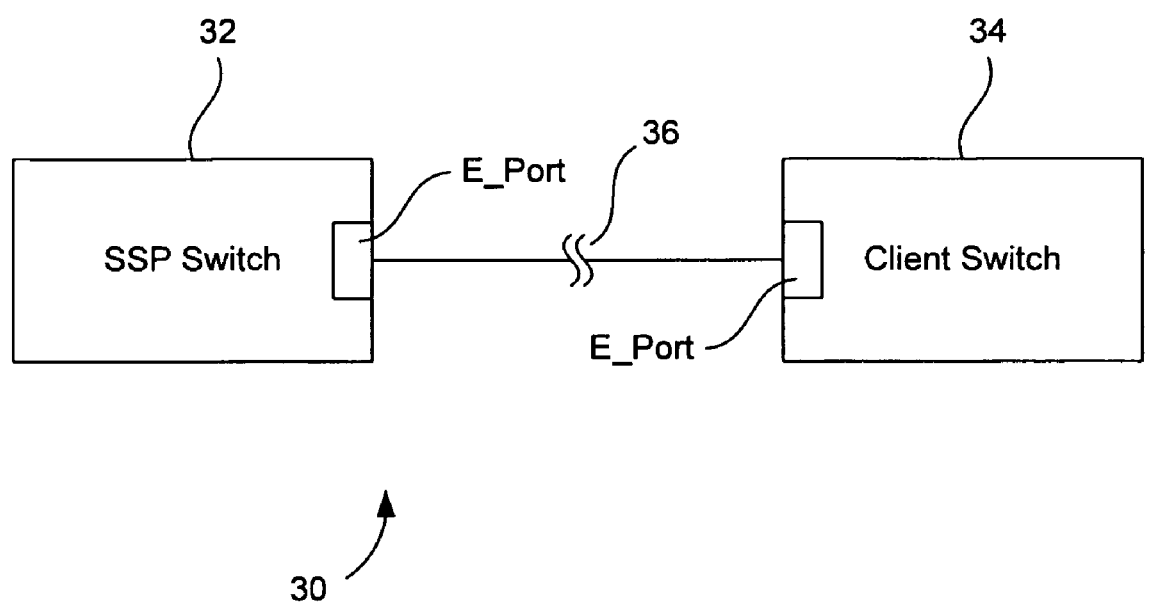
FIG. 3 illustrates a logical disconnect between a core Switch and a client Switch according to the present invention.

Referring to FIG. 3, a diagram illustrating the logical disconnect between the E_Ports of a client Switch and a SSP Switch is shown. The diagram shows the E_Port of a Switch 32 of the Fabric 12 belonging to the SSP and the E_Port of a Switch 34 of the client logically disconnected by a break in the connection 36. It should be noted that the disconnect is a logical disconnect and not a physical disconnect, as is described in the Fibre Channel standard FC-SW-2 as the resulting status of when the two E_Ports connected by a link are in the Isolated state. In the manner described above, the Fabric 12 can be configured so that some or all of the Ports of the Switches can be configured to reject RCF messages. This arrangement allows, from a practical point of view, the Fabric 12 to be used by two (or more) clients. The arrangement also prevents any one client from disrupting the Fabric 12 to the detriment of the other client(s) while attempting to perform an action that involves an RCF message. The Fabric will remain in this state and can therefore be accessed by two or more clients until the Ports of the Switches are re-configured to accept RCF messages. Typically the Ports of the Switches can be re-configured to accept RCF messages only by an explicit management action intended to revoke the aforementioned state of the Ports.

The embodiments of the present invention described above are to be considered as illustrative and not restrictive. For example, the present invention does not necessarily have to be used with a SAN. Rather, it can be used by any type of network with Fibre Channel Switches operating as described in the Fibre Channel standard FC-SW-2 to perform the Fabric configuration. The invention is not to be limited to the details given herein, but may be modified within the scope and equivalents of the appended claims.

What is claimed is:

1. A method comprising:
   at a first switch of a fabric of a storage area network, configuring a first port of the first switch to reject reconfigure fabric messages;
   determining that the first port has received a reconfigure fabric message from a second port of a second switch of the fabric of the storage area network; and
   transitioning the first port to an isolated state after the first port receives the reconfigure fabric message,
   wherein the configuring the first port of the first switch to reject reconfigure fabric messages is performed by an administrator or a client, and wherein the configuring is performed at least in part to prevent disruptions of the fabric.

2. The method of claim 1, further comprising reconfiguring the first port to accept reconfigure fabric messages upon receiving a management action to revoke the isolated state of the first port.

3. The method of claim 2, further comprising reassigning the identifiers of any end devices connected to the first switch after reconfiguring the first port to accept reconfigure fabric messages.

4. The method of claim 1, further comprising disabling a domain manager of the first switch.

5. The method of claim 1, wherein configuring the first port of the first switch to reject reconfigure fabric messages comprises configuring the first port to respond to reconfigure fabric messages with a rejection message with a reason code explanation "E_Port Isolated".

6. The method of claim 1, further comprising configuring the first switch through a command line interpreter or a management application to selectively configure the ports of the first switch to reject the reconfigure fabric messages.

7. A Switch configured to be included in the Fabric of a storage area network, the Switch comprising:
   logic to selectively reject or accept reconfigure fabric messages,
   wherein a first port associated with the switch transitions to an isolated state after receiving a reconfigure fabric message and triggers a second port sending the reconfigure fabric message to transition to the isolated state, the second port associated with another Switch,
   wherein the first port remains in the isolated state until a management action reconfigures the first port to accept reconfigure fabric messages, and
   wherein the configuring the first port of the first switch to reject reconfigure fabric messages is performed by an administrator or a client, and wherein the configuring is performed at least in part to prevent disruptions of the fabric.

8. The Switch of claim 7, wherein the logic is configured to selectively cause a port of the Switch to reject reconfigure fabric messages when the logic is selected to reject reconfigure fabric messages.

9. The Switch of claim 8, wherein the logic is further configured to cause a port to generate a reject message if a reconfigure fabric message is received and the logic is selected to reject reconfigure fabric messages.

10. The Switch of claim 7, wherein the logic is configured to allow reconfigure fabric messages to be accepted by the Switch upon receiving a management action to revoke the isolated state of the first port.

11. The Switch of claim 10, wherein the logic is configured to reassign the identifiers of any end devices connected to the Switch after reconfiguring the first port to accept reconfigure fabric messages.

12. The Switch of claim 7, wherein the logic is configured to disable a domain manager of the Switch.

13. The Switch of claim 9, wherein configuring the first port to reject reconfigure fabric messages comprises configuring the first port to respond to reconfigure fabric messages with a rejection message with a reason code explanation "E_Port Isolated".

14. The Switch of claim 9, further comprising configuring the Switch through a command line interpreter or a management application to selectively configure the ports of the Switch to reject the reconfigure fabric messages.

15. A system comprising one or more network devices comprising a processor, a memory, and a network interface attached to a network, each of the one or more network devices configured to:
    configure a first port of the network device to reject reconfigure fabric messages;
    determine at the network device that the first port has received a reconfigure fabric message from a second port of another network device of the fabric of the storage area network; and
    transition the first port to an isolated state after the first port receives the reconfigure fabric message,
    wherein the configuring the first port of the first switch to reject reconfigure fabric messages is performed by an administrator or a client, and wherein the configuring is performed at least in part to prevent disruptions of the fabric.

16. The system of claim 15, wherein the one or more network devices is further configured to reconfigure the first port to accept reconfigure fabric messages upon receiving a management action to revoke the isolated state of the first port.

17. The system of claim 15, wherein each of the one or more network devices is further configured to disable a domain manager of the network device.

18. The system of claim 15, wherein the other network device is configured to transition the second port sending the reconfigure fabric messages to the isolated state after the first port transitions to the isolated state.

19. A method to configure a plurality of Switches arranged in a Fabric of a storage area network, comprising:
    at a Fabric of a storage area network, permitting an administrator to establish a connection to the Fabric, the Fabric including a plurality of Switches; and
    transmitting messages from the administrator to one or more of the Switches requesting that the Switches, including a first switch, configure one or more of their Ports to reject reconfigure fabric messages;
    wherein the first switch transitions to an isolated state after receiving a reconfigure fabric message from a second switch and triggers the second switch to transition to the isolated state.

* * * * *